(12) United States Patent
Fougerolle

(10) Patent No.: US 6,779,798 B1
(45) Date of Patent: Aug. 24, 2004

(54) SEALING ARRANGEMENT

(75) Inventor: Fabrice Fougerolle, Montlandon (FR)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/760,230

(22) Filed: Jan. 12, 2001

(30) Foreign Application Priority Data

Jan. 12, 2000 (DE) ........................................ 100 00 853

(51) Int. Cl.$^7$ ................................................ F16J 3/00
(52) U.S. Cl. ...................... 277/320; 277/549; 277/551; 277/559
(58) Field of Search ................................ 277/549, 551, 277/559, 320

(56) References Cited

U.S. PATENT DOCUMENTS

| | | | |
|---|---|---|---|
| 4,427,205 A | * | 1/1984 | Holzer et al. ............... 277/559 |
| 5,462,287 A | * | 10/1995 | Hering et al. | |
| 5,791,658 A | * | 8/1998 | Johnston .................... 277/559 |
| 6,168,164 B1 | * | 1/2001 | Toth et al. .................. 277/559 |
| 6,182,975 B1 | * | 2/2001 | Matsushima et al. ....... 277/559 |
| 6,336,638 B1 | * | 1/2002 | Guth et al. ............. 277/559 X |

FOREIGN PATENT DOCUMENTS

| | | | |
|---|---|---|---|
| DE | 38 30 711 | 3/1990 | |
| DE | 195 32 701 | 3/1997 | |
| DE | 195 39 057 | 4/1997 | |
| DE | 19836986 A1 | * 2/2000 | ............ F16J/15/16 |

* cited by examiner

*Primary Examiner*—Anthony Knight
*Assistant Examiner*—Enoch Peavey
(74) *Attorney, Agent, or Firm*—Kenyon & Kenyon

(57) ABSTRACT

A sealing arrangement includes a sealing ring (1) having a sealing lip (3) which is curved forward in the direction of the area to be sealed off (2). The sealing lip (3) is pre-tensioned so as to surround and form a seal around the circumference of the machine element (4) to be sealed off. The sealing lip (3) has, on the side facing radially away from the machine element (4), at least one recess (5). The recess (5) only connects and allows flow between the area to be sealed off (2) and the surrounding area (6) if the sealing ring (1) is incorrectly mounted and the sealing lip (3) is erroneously curved forward in the direction of the surrounding area (6).

20 Claims, 4 Drawing Sheets

SEALING ARRANGEMENT

FIELD OF THE INVENTION

The present invention relates generally to a sealing arrangement and more particularly, to a sealing arrangement that includes a sealing ring having a sealing lip which is curved forward in the direction of an area to be sealed off and pre-tensioned so that it surrounds and forms a seal around the circumference of a machine element to be sealed off.

BACKGROUND OF THE INVENTION

A sealing arrangement of this kind is generally known in the art. For example, German Patent Application 195 32 701 A1 discloses a lip sealing ring for a machine element that is movable relative thereto. The sealing ring includes a flexible sealing lip made of a polymeric material. The sealing lip has a recirculating spiral groove on the side facing the machine element. The recirculating spiral groove constitutes a recessed groove in the sealing lip. The recirculating spiral groove is interrupted at a given point and closed off with wax. In order to detect whether the unit has a tight seal, pressure in excess of atmospheric pressure is applied to the area to be sealed off. During this pressure test, the wax prevents the compressed air from escaping through the recirculating spiral groove. In this type of sealing arrangement, however, it is impossible to detect incorrectly mounted sealing rings where the sealing lip is erroneously curved forward in the direction of the surrounding area rather than in the direction of the area to be sealed off.

In many instances, sealing rings are installed by automated assembling devices. Due to unforeseeable circumstances, sealing lips sometimes become inverted. Thus, in the area of their inner circumference, the sealing lips point in the direction of the surrounding area rather than in the direction of the area to be sealed off. As a result, the seal proves unsatisfactory during use. It is therefore necessary to check each individual sealing ring following assembly in order to determine whether or not the sealing lip is pointing in the direction of the space to be sealed off. However, particularly in assembly positions where it is difficult to see the location where the seal is installed, it may be difficult to perform manual checks. Therefore, once all machine elements to be sealed off have been installed it is necessary to fill the area to be sealed off with compressed air at a predefined control pressure and observe the drop in pressure over a specific time period. If the pressure falls very quickly, this is a sure sign that an assembly error has occurred in at least one of the machine elements.

German Patent Application 195 32 701 A1 discloses a sealing arrangement that has a sealing lip which is smooth on the side facing the machine element to be sealed off. If sealing arrangements of this type are mounted incorrectly and are curved forward in the direction of the surrounding area, no drop in pressure occurs during a pressure test. Therefore, assembly errors cannot be detected.

SUMMARY OF THE INVENTION

The object of the present invention is to provide a sealing arrangement that allows the use of a pressure test (following mounting) to efficiently detect a sealing lip that is erroneously curved forward in the direction of the surrounding area.

This object is achieved by a sealing arrangement which has a sealing ring. The sealing ring has a sealing lip. The sealing lip is curved forward in the direction of an area to be sealed off and pretensioned so as to surround and form a seal around the circumference of a machine element to be sealed off.

The sealing lip has, on the side facing radially away from the machine element, at least one recess which only connects and allows flow between the area to be sealed off and the surrounding area if the sealing ring has been incorrectly mounted and the sealing lip is erroneously curved forward in the direction of the surrounding area. When correctly mounted, the sealing lip is curved forward axially in the direction of the area to be sealed off. In this situation, the recess has no effect. The recess opens out axially on one side into the area to be sealed off but not into the surrounding area.

However, if the sealing lip has become inverted during assembly and is pointing in the direction of the surrounding area, the surface of the sealing lip in which the recess is provided is in contact with the surface of the machine element to be sealed off and connects, thereby allowing flow between the area to be sealed off hand the surrounding area. When a static test for air-tightness, also known as a cold test, is performed, the compressed air fed into the area to be sealed off escapes through the recess into the surrounding area. The unusually rapid drop in pressure indicates that the sealing ring has been incorrectly mounted and that the sealing lip has become inverted and is facing in the direction of the surrounding area.

Once the error has been detected, the incorrectly mounted sealing ring is removed and replaced with a new, correctly mounted sealing ring.

Without the recess, the pressure inside the area to be sealed off would essentially have remained constant during the static test for air-tightness, and the error would therefore not have been detected.

Regardless of whether the sealing lip is curved forward in the direction of the area to be sealed off or in the direction of the surrounding area, the recess essentially extends in the axial direction.

The recess may be embodied as a tube-type channel. Preferably the cross section of the channel is dimensioned so that the resistance to flow is as low as possible. In this manner, when the static test for air-tightness is performed, it is immediately and clearly detectable after pressure has been applied to the area to be sealed off that the sealing lip is erroneously curved forward in the direction of the surrounding area.

In order to ensure that the resistance to flow is as low as possible and that the pressure falls rapidly if the sealing lip is erroneously curved forward in the direction of the surrounding area, it is advantageous if at least two recesses uniformly distributed around the circumference are provided. Alternatively, any number of recesses may be used. For example, eight recesses uniformly distributed around the circumference can be provided. A large number of recesses is particularly advisable if the sealing ring has small dimensions. In this situation, it is difficult to create recesses that are deep in the radial direction.

The sealing lip may be made of a polymeric material, e.g. PTFE. PTFE has the advantageous property that following very slight initial wear and tear, it becomes vitreous. As a result, it becomes hard and resistant to wear and tear despite its elasticity and ability to create an effective seal.

On the side radially facing the machine element, the sealing lip may have a recirculating spiral groove for the medium that is to be sealed off. If the sealing lip is mounted correctly, the machine element to be sealed off, for example a shaft, will be surrounded by a thread-shaped recirculating spiral groove. When the sealing ring is used in the specified manner, the medium to be sealed off that is located within the sealing gap beneath the sealing lip is recirculated into the area to be sealed off via the recirculating spiral groove.

Although a thread-shaped recirculating spiral groove does connect the area to be sealed off to the surrounding area, it is so narrow as to be merely capillary-active. This means that if the sealing lip is erroneously curved forward in the direction of the surrounding area, the pressure falls considerably more quickly than if the sealing lip is mounted correctly. Thus, even in embodiments of the sealing lip which have a recirculating spiral groove, it is possible to unambiguously determine whether the sealing lip is correctly mounted by observing the significant difference in the rate at which the pressure falls over time.

BRIEF DESCRIPTION OF THE DRAWING

The subject matter of the present invention is explained in greater detail below with the help of the drawings, which show an exemplary embodiment of the invention.

DETAILED DESCRIPTION OF THE INVENTION

Figure 1:
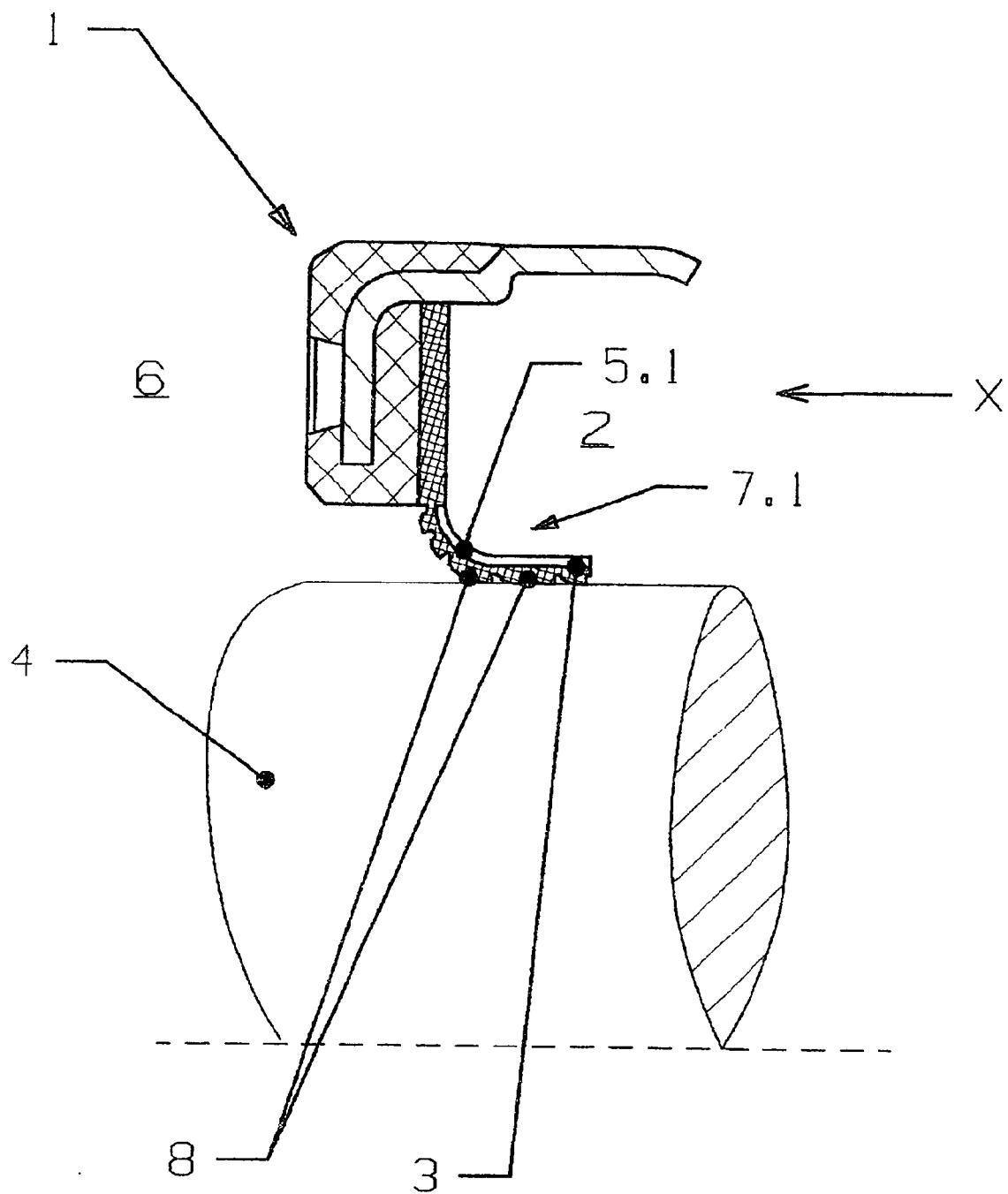
FIG. 1 shows a section through a sealing arrangement having a correctly mounted sealing ring.

FIG. 1 shows a sealing arrangement having a sealing ring 1 mounted correctly. A sealing lip 3 of the sealing ring 1 is curved forward in the direction of an area 2 to be sealed off. The sealing lip 3 is pre-tensioned so as to surround the circumference of a machine element 4, which is a shaft in this illustrated embodiment.

On the side radially facing the machine element 4, the sealing lip 3 has a recirculating spiral groove B. When machine element 4 moves relative to the sealing lip 3, the groove 8 recirculates the medium to be sealed off in the direction of the area 2 to be sealed off.

In this exemplary embodiment illustrated here, eight recesses 5.1, . . . ,5.8 are evenly distributed around the circumference of the sealing lip 3 on the side facing radially away from the machine element 4. The recesses open out axially into the area 2 to be sealed off. In this exemplary embodiment, the recesses extend into the area where deflection from the axial to the radial direction occurs. Alternative embodiments are possible. For example, the recesses 5 can extend not only essentially in the axial direction, but also may deflect from the axial direction to the radial direction and then extend in the radial direction.

In the correct mounting position shown here, the recesses 5.1, . . . ,5.8 have no function. During a static test for air-tightness, pressure is applied to the area 2 to be sealed off. In this example, the pressure escapes only very slowly through the recirculating spiral groove 8 in the direction of a surrounding area 6. As a result, it is possible to determine that the sealing ring has been correctly mounted.

Figure 2:
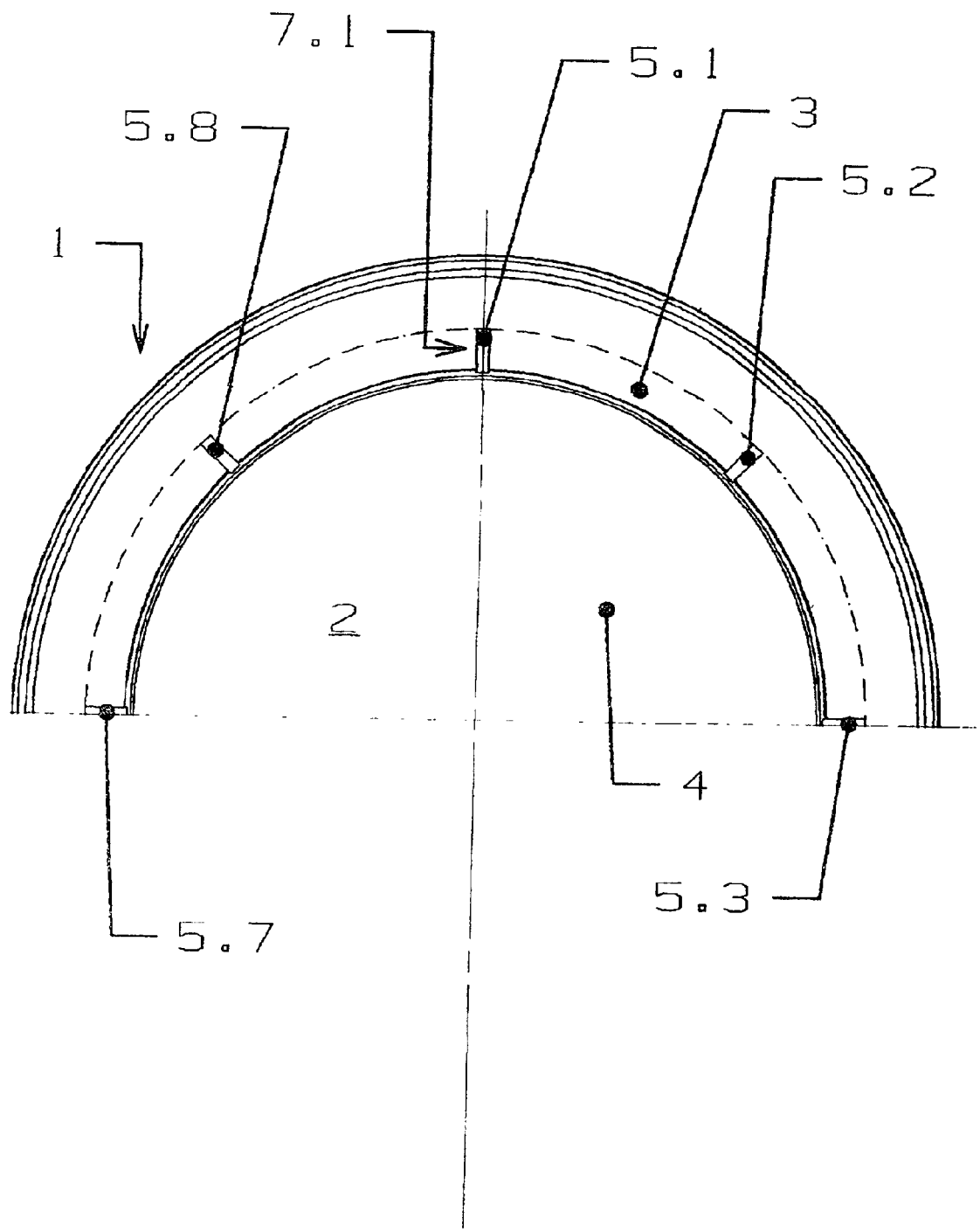
FIG. 2 shows the sealing arrangement shown in FIG. 1, viewed from the right, i.e., from the direction of the area to be sealed off.

FIG. 2 shows the sealing arrangement shown in FIG. 1 viewed from the right. The recesses 5.1, . . . ,5.8 extend so that they deflect from the axial direction to the radial direction, essentially extending in a straight line. The sealing lip 3 surrounds the surface of the machine element 4 to be sealed off so that a seal is essentially formed.

Figure 3:
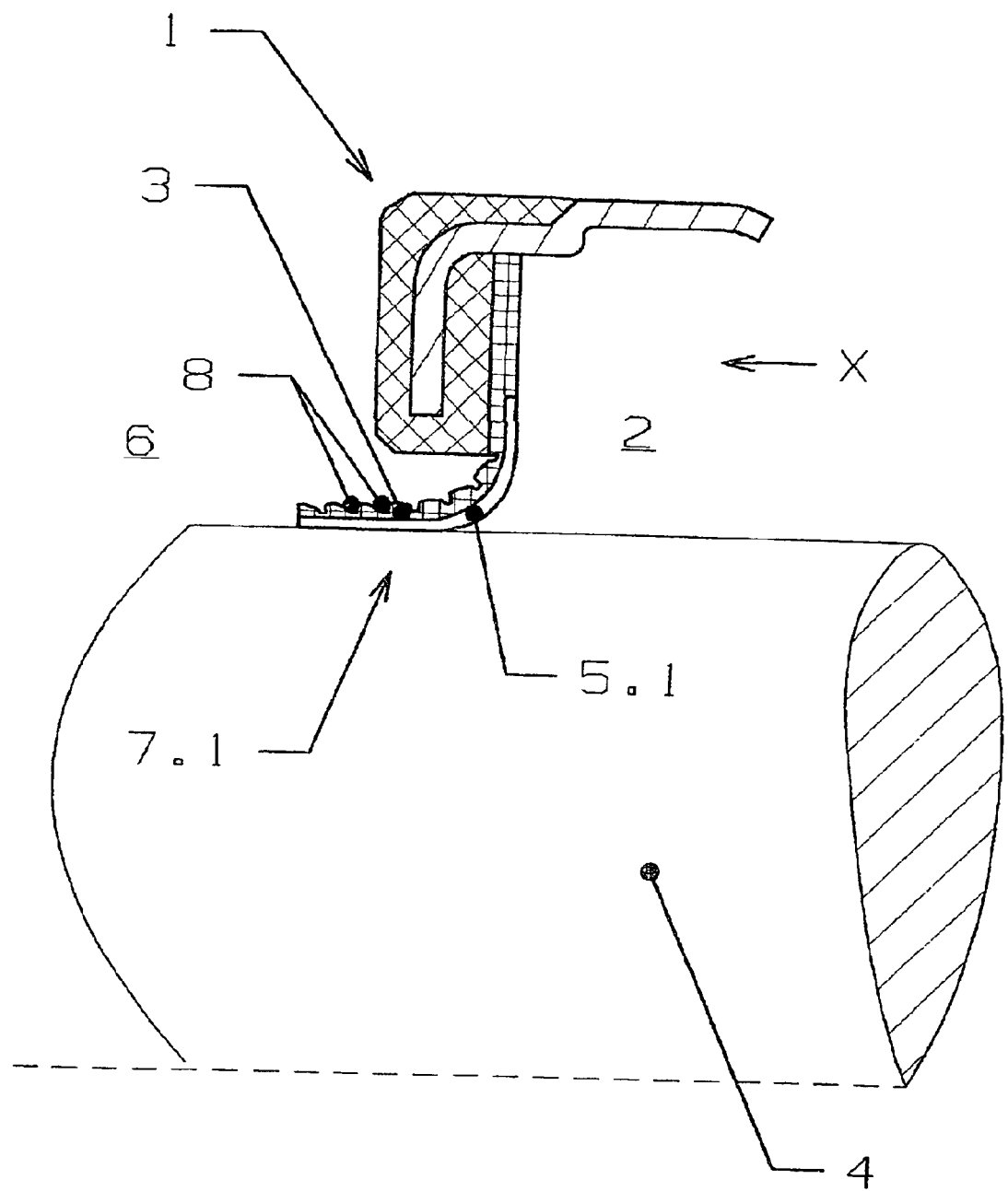
FIG. 3 shows a sealing arrangement having an incorrectly mounted sealing ring, where the sealing lip is curved forward in the direction of the surrounding area.

FIG. 3 shows the sealing arrangement shown in FIG. 1. However, in FIG. 3, the sealing lip 3 is erroneously curved forward in the direction of the surrounding area 6. Because the sealing ring 1 is incorrectly mounted, the area 2 to be sealed off is connected via the recesses 5.1, . . . ,5.8 to the surrounding area 6 in such a way as to allow flow. When a static test for air-tightness is performed, an attempt is made to apply pressure in excess of atmospheric pressure to the area 2 to be sealed off. However, if this is possible at all, it is only possible to a limited degree based on the design of the recesses 5. The pressure in excess of atmospheric pressure applied to the area to be sealed off is very rapidly released via the recesses 5, which connect to the surrounding area 6 in such a way as to allow flow. This drop in pressure is a sure sign that the sealing lip 3 is erroneously curved forward in the direction of the surrounding area 6.

Figure 4:
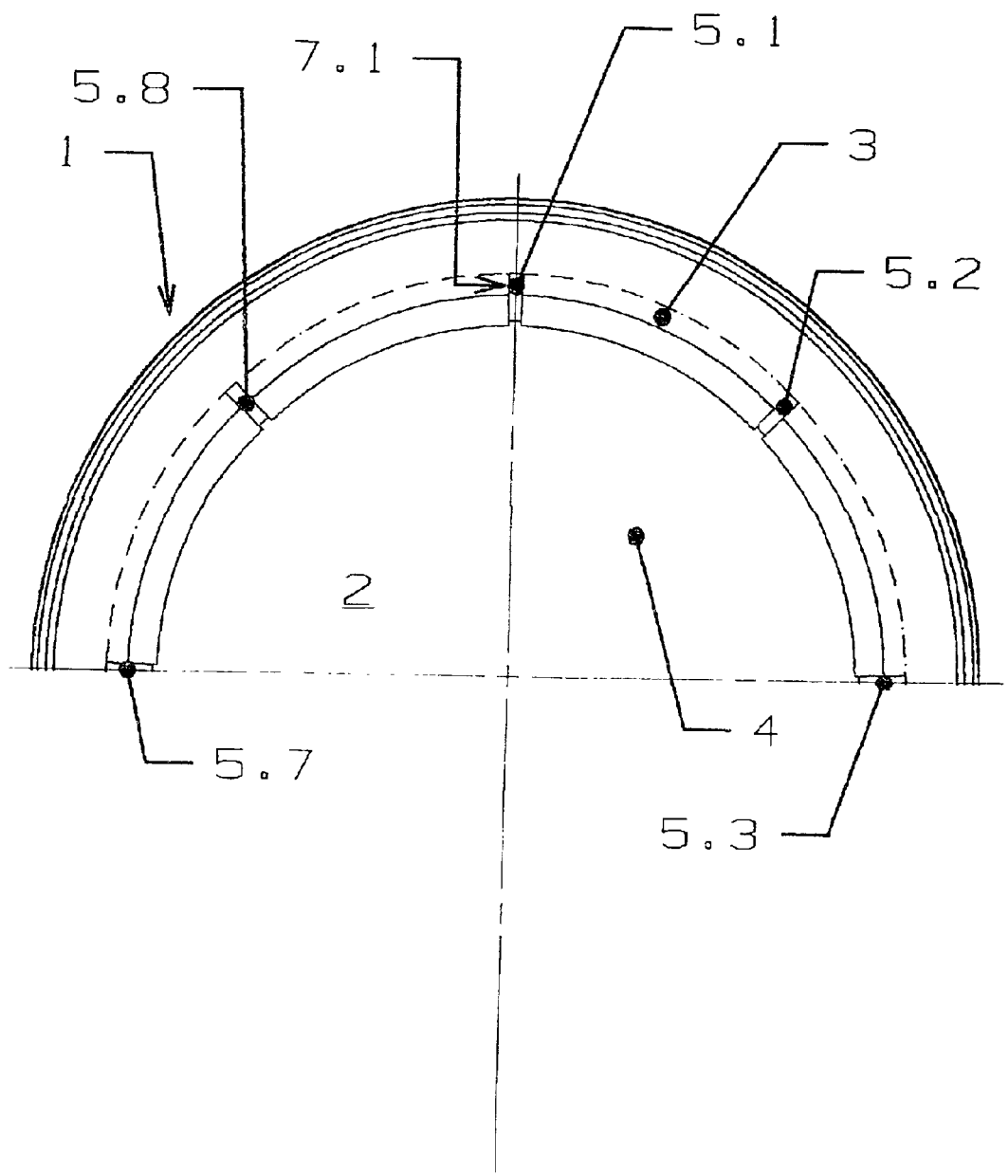
FIG. 4 shows the sealing arrangement shown in FIG. 3, viewed from the right, i.e., from the direction of the area to be sealed off.

FIG. 4 shows the sealing arrangement shown in FIG. 3 viewed from the right. The recesses 5.1, . . . ,5.8 extend inwards in the radial direction as far as the surface of the machine element 4 to be sealed off. Thus, in conjunction with the surface of machine element 4 to be sealed off, the recesses 5.8 form channels 7.1, . . . ,7.8 respectively. The channels connect and allow flow between the area 2 to be sealed off and the surrounding area 6.

What is claimed is:

1. A sealing arrangement which includes a sealing ring having a sealing lip which is curved forward in the direction of an area to be sealed off and pre-tensioned so as to surround and form a seal around a circumference of a machine element to be sealed off, wherein the sealing lip has, on a side facing radially away from the machine element, at least one recess which only connects and allows flow between the area to be sealed off and a surrounding area if the sealing ring is curved forward in the direction of the surrounding area, said at least one recess extending in the sealing lip and having a depth in a radial direction between the side facing radially away from the machine element and a side facing the machining element.

2. The sealing arrangement according to claim 1, wherein the recess is embodied as a tube-like channel.

3. The sealing arrangement according to claim 2, wherein at least two recesses are uniformly distributed around the circumference.

4. The sealing arrangement according to claim 2, wherein the sealing lip has, on the side radially facing the machine element, a recirculating spiral groove for the medium that is to be sealed off.

5. The sealing arrangement according to claim 1, wherein at least two recesses are uniformly distributed around the circumference.

6. The sealing arrangement according to claim 5, wherein the sealing lip has, on the side radially facing the machine element, a recirculating spiral groove for the medium that is to be sealed off.

7. The sealing arrangement according to claim 1, wherein the sealing lip is made of a polymeric material.

8. The sealing arrangement according to claim 7, wherein the sealing lip is made of PTFE.

9. The sealing arrangement according to claim 1, wherein the sealing lip has, on the side radially facing the machine element, a recirculating spiral groove for the medium that is to be sealed off.

10. The sealing arrangement according to claim 1, wherein a distal end of the sealing lip contacts the machine element when curved forward in the direction of the area to be sealed off.

11. A sealing arrangement for forming a seal around a machine element, comprising:

a sealing ring including a sealing lip, the sealing lip including at least one recess on a side of the sealing lip facing radially away from the machine element, said at least one recess extending in the sealing lip and having a depth in a radial direction between the side facing radially away from the machine element and a side facing the machining element.

12. The sealing arrangement according to claim 11, wherein the at least one recess includes a tube-like channel.

13. The sealing arrangement according to claim 11, wherein the at least one recess includes at least two recesses uniformly distributed around a circumference of the sealing lip.

14. The sealing arrangement according to claim 11, wherein the sealing arrangement is made of a polymeric material.

15. The sealing arrangement according to claim 14, wherein the polymeric material includes PTFE.

16. The sealing arrangement according to claim 11, wherein the sealing lip further includes a recirculating spiral groove on a side of the sealing lip radially facing toward the machine element.

17. The sealing arrangement according to claim 11, wherein a distal end of the sealing lip contacts a machine element when curved forward in a direction of an area to be sealed off.

18. A sealing arrangement for forming a seal around a machine element, comprising:

a sealing ring operable to permit flow between an area to be sealed off and a surrounding area, via at least one recess extending in the sealing ring and having a death in a radial direction between a side of the sealing ring facing radially away from the machine element and a side facing the machine element, if the sealing ring is incorrectly mounted on the machine element.

19. The sealing arrangement according to claim 18, wherein the sealing ring further includes a sealing lip, the sealing ring being operable to permit the flow if the sealing lip is erroneously curved forward in a direction of the surrounding area.

20. The sealing arrangement according to claim 18, wherein a distal end of the sealing ring contacts a machine element when curved forward in a direction of an area to be sealed off.

\* \* \* \* \*

UNITED STATES PATENT AND TRADEMARK OFFICE
CERTIFICATE OF CORRECTION

PATENT NO. : 6,779,798 B1
DATED : August 24, 2004
INVENTOR(S) : Fabrice Fougerolle It is certified that error appears in the above-identified patent and that said Letters Patent is hereby corrected as shown below:

Column 6,
Line 12, delete "death" and insert -- depth --

Signed and Sealed this

Twelfth Day of July, 2005

JON W. DUDAS
*Director of the United States Patent and Trademark Office*